United States Patent
Kaura et al.

(12) 
(10) Patent No.: US 10,674,441 B2
(45) Date of Patent: Jun. 2, 2020

(54) CONNECTION CONFIGURATION METHOD

(71) Applicant: Samsung Electronics Co., Ltd, Gyeonggi-do (KR)

(72) Inventors: Ricky Kumar Kaura, Middlesex (GB); Howard Peter Benn, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/323,956

(22) PCT Filed: Jul. 2, 2015

(86) PCT No.: PCT/KR2015/006833
§ 371 (c)(1),
(2) Date: Jan. 4, 2017

(87) PCT Pub. No.: WO2016/003220
PCT Pub. Date: Jan. 7, 2016

(65) Prior Publication Data
US 2017/0171805 A1 Jun. 15, 2017

(30) Foreign Application Priority Data
Jul. 4, 2014 (GB) .................................. 1411981.2

(51) Int. Cl.
*H04W 48/18* (2009.01)
*H04W 76/18* (2018.01)

(52) U.S. Cl.
CPC ........... *H04W 48/18* (2013.01); *H04W 76/18* (2018.02)

(58) Field of Classification Search
CPC ..... H04W 48/16; H04W 48/18; H04W 12/06; H04W 12/08; H04W 48/08; H04W 76/02;
(Continued)

(56) References Cited

U.S. PATENT DOCUMENTS

2011/0170517 A1 7/2011 Bakker et al.
2011/0310799 A1 12/2011 Horn et al.
(Continued)

FOREIGN PATENT DOCUMENTS

EP 2961223 A1 12/2015
GB 2509975 A 7/2014
(Continued)

OTHER PUBLICATIONS

Foreign communication from a related counterpart application, GB Application No. 1411981.2, Combined Search and Examination Report under Sections 17 & 18(s), dated Nov. 4, 2014.
(Continued)

*Primary Examiner* — Quoc Thai N Vu

(57) ABSTRACT

A method for configuring a connection between a User Equipment, UE, and a 3rd Generation Partnership Project, 3GPP, compliant mobile communications network at the UE. The method comprises checking a service equivalency indicator, the service equivalency indicator indicating zero or more mobile communications networks the UE is permitted to transmit a new request for a PDN connection corresponding to a previously rejected request for a PDN connection. If the service equivalency indicator indicates that there is at least one mobile communications network including the mobile communications network to which the UE is currently attached for which it is permitted to transmit a request for a PDN connection corresponding to a previously rejected request for a PDN connection, and a new PDN connection corresponding to a previously rejected request for a PDN connection is required, the method further comprises transmitting a new request for a PDN connection, the new request corresponding to a previously rejected request for a PDN connection.

8 Claims, 12 Drawing Sheets

(58) Field of Classification Search
CPC ...... H04W 76/027; H04L 63/08; H04L 63/10; H04L 63/107
See application file for complete search history.

(56) References Cited

U.S. PATENT DOCUMENTS

| | | | |
|---|---|---|---|
| 2012/0044869 A1 | 2/2012 | Tiwari | |
| 2012/0077456 A1 | 3/2012 | Tiwari | |
| 2012/0282924 A1* | 11/2012 | Tagg | H04W 60/06 455/432.1 |
| 2015/0358898 A1* | 12/2015 | Lair | H04W 48/12 455/434 |
| 2016/0345243 A1* | 11/2016 | Zaus | H04W 48/14 |

FOREIGN PATENT DOCUMENTS

| | | |
|---|---|---|
| WO | 2013137629 A1 | 9/2013 |
| WO | 2016003818 A1 | 1/2016 |

OTHER PUBLICATIONS

Foreign communication from a related counterpart application, GB Application No. 1411981.2, Examination Report under Section 18(3), dated Apr. 19, 2017.

3GPP TS 24.008 V12.6.0, "3rd Generation Partnership Project;' Technical Specification Group Core Network and Terminals' Mobile Radio Interface Layer 3 Specification; Core Network Protocols; Stage 3 (Release 12)", Jun. 27, 2014, http://www.3gpp.org/dynareport/24008.htm, 699 pages.

International Search Report dated Oct. 20, 2015 in connection with International Application No. PCT/KR2015/006833, 4 pages.

Written Opinion of the International Searching Authority dated Oct. 20, 2015 in connection with International Application No. PCT/KR2015/006833, 6 pages.

ZTE; "PDN Connection for emergency service"; Change Request; 3GPP TSG CT WG1 Meeting #60; C1-093423; Sevilla, Spain; Aug. 24-28, 2009; 11 pages.

HTC; "Handling of ESM cause# 50, 51 and 66"; Change Request; 3GPP TSG-CT WG1 Meeting #86; C1-140456; Guangzhou, P.R. of China; Jan. 20-24, 2014; 6 pages.

Alcatel-Lucent et al.; "Evaluation on extending UE retry handling for other ESM/SM cause codes"; 3GPP TSG CT WG1 Meeting #86bis; Dubrovnik, Croatia; Mar. 31-Apr. 4, 2014; 6 pages.

Foreign Communication from Related Counterpart Application; European Patent Application No. 15816067.1; Extended European Search Report and European Search Opinion dated Jan. 5, 2018; 11 pages.

* cited by examiner

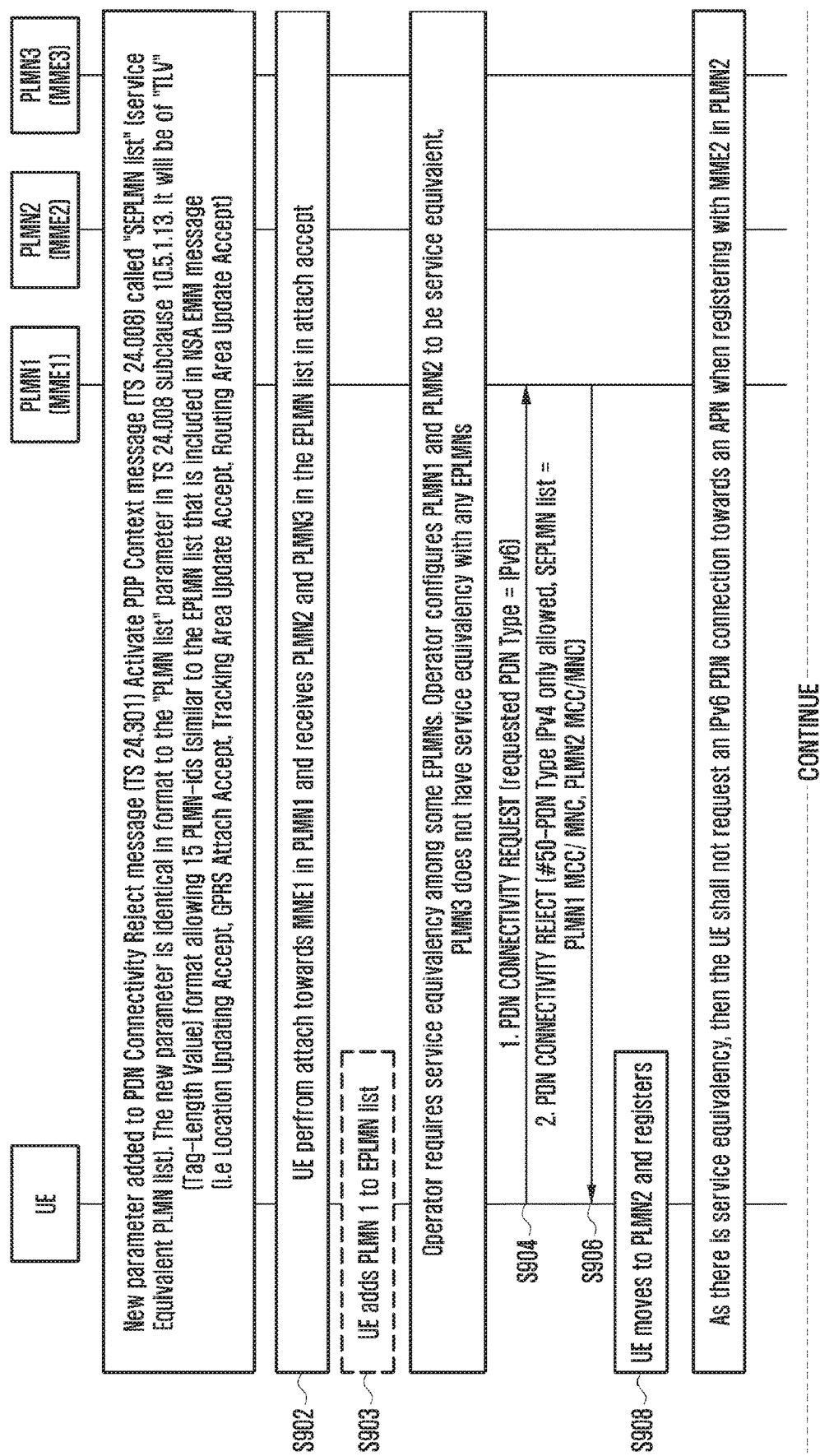

CONNECTION CONFIGURATION METHOD

CROSS-REFERENCE TO RELATED APPLICATION(S)

The present application claims priority under 35 U.S.C. § 365 to International Patent Application No. PCT/KR2015/006833 filed Jul. 2, 2015, entitled "CONNECTION CONFIGURATION METHOD", and, through International Patent Application No. PCT/KR2015/006833, to British Patent Application No. 1411981.2 filed Jul. 4, 2014, each of which are incorporated herein by reference into the present disclosure as if fully set forth herein.

TECHNICAL FIELD

The present invention relates to connection configuration method. In particular, the present invention relates to methods for configuring a connection between a User Equipment (UE, also referred to herein as a mobile terminal) and a 3rd Generation Partnership Project (3GPP) compliant mobile communications network. The present invention further relates to a user equipment arranged to implement the method. Certain embodiments of the present invention also relate to a 3GPP compliant mobile communications network and a UE.

Example embodiments of the present invention may be implemented in a 3rd 3GPP mobile communications network comprising a UE and network equipment (also referred to herein as a base station and enhanced NodeB (eNB)). Certain embodiments of the present invention are particularly directed to Long Term Evolution (LTE) compliant mobile communications networks and UEs, but the present invention is not restricted to LTE.

BACKGROUND ART

Wireless or mobile communications networks in which a mobile terminal (UE, such as a mobile handset) communicates via a radio link to a network of base stations (eNBs) or other wireless access points connected to a telecommunications network, have undergone rapid development through a number of generations. The initial deployment of systems using analogue signalling has been superseded by second generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been replaced by or augmented by third generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards fourth generation (4G) systems.

GPP design, specify and standardise technologies for mobile (cellular) wireless communications networks. Specifically 3GPP produces a series of technical reports (TR) and technical specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and LTE concerning the air interface. The first set of EPS specifications were released as 3GPP Release 8 in December 2008. LTE uses an improved radio access technology known as Evolved UTRAN (E-UTRAN), which offers potentially greater capacity and additional features compared with previous standards. SAE provides an improved core network technology referred to as the Evolved Packet Core (EPC). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

The present invention may be implemented within a 2G/3G or LTE mobile network. An overview of an LTE network is shown in FIG. 1. The LTE system comprises three high level components: at least one UE 102, the E-UTRAN 104 and the EPC 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces media is represented by solid lines and signalling is represented by dashed lines.

The E-UTRAN 104 comprises a single type of component: an eNB which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE communicates with one eNB through one cell at a time.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104 and thus an eNB). Signalling messages between the MME 114 and the UE 102 are provided by the Non-access stratum (NAS) layer and comprise EPS Mobility Management (EMM) and EPS Session Management (ESM) protocol messages. The EMM protocol supports the mobility of a UE such as informing the network of its location, providing control of security and providing connection management services to the session management sublayer, for example in order to create a signalling connection for the UE to send data to the network. The ESM protocol provides procedures for the handling of EPS bearer contexts which are signalling contexts provided between the UE and the P-GW to control the flow of data from the UE to the outside world. The MME 114 exchanges signalling traffic with the S-GW 110 to assist with routing data traffic. The MME 114 also communicates with a Home Subscriber Server (HSS) 116 which stores information about users registered with the network.

Key components of the UE 102 and an eNB 202 which forms part of the E-UTRAN are shown in FIG. 2. The UE includes at least a receiver 204 for receiving radio communications from the eNB over the air interface, a transmitter 206 for transmitting radio communications to the eNB over the air interface and a controller 208 which is configured to control the receiver and transmitter to perform the reception and transmission of radio communications to and from the eNB respectively. Although the UE is illustrated as comprising only a receiver, transmitter and controller, it may also include any number of other components such as memory and a processor for example. The eNB includes at least a receiver 210 for receiving radio communications from the UE over the air interface, a transmitter 212 for transmitting radio communications to the UE over the air interface and a controller 214 which is configured to control the receiver and transmitter to perform the reception and transmission of radio communications to and from the UE respectively, where signalling messages between the UE 102 and the eNB 202 are provided by the Access Stratum (AS) layer. As for the UE, the eNB may also include any number of other components such as a processor and memory for example as well as components required to communicate with the EPC. Also, for both the UE 102 and the eNB 202 although separate transmitters and receivers are shown, they may be combined to form a transceiver at the UE and a transceiver at the eNB. The eNBs which form the E-UTRAN may also include an X2 interface for communicating between one another for purposes such as handover for example.

When a UE is first switched on or first enters a coverage area of the E-UTRAN, the UE is required to attach to a network. Conventionally, a UE in such a scenario will attempt to attach to network to which it has a subscription, or more specifically a network specified by information stored on the USIM of the UE. Once a network corresponding to the USIM information has been detected, the UE will request a connection to the network via the serving eNB in order to transmit an attach request to an MME of the network.

Mobile communications networks such as that illustrated in FIG. 1 are also referred to as Public Land Mobile Networks (PLMN) and different PLMNs are identified via identifiers which include a Mobile Country Code (MMC) and a Mobile Network Code (MNC). Networks operated by different operators will have different identifiers as well as networks which operate in accordance with different standards such as GSM, 3G and LTE and those in different countries. Accordingly, when a UE is first switched on it will firstly detect available networks and if a network PLMN identity which corresponds to its "home network" identity is detected, it will transmit an attach request to the network.

DISCLOSURE OF INVENTION

Technical Problem

In order to provide flexibility with regards to mobility management and network attachment, the concept of PLMN equivalency was first introduced in into 3GPP in 2001 with the intention to assist with roaming, handover and cell re-selection for example in 2G, 3G and LTE networks. In particular, the PLMN equivalency enables UEs to treat other networks which are not its home network (HPLMN) as equivalent to its home network. This therefore allows UEs to attach to networks which may not be their home network or currently registered network.

Equivalency may be used in a number of ways, for example operators which operate mobile networks in multiple countries across Europe may wish for its networks (which have different PLMNS because they are in different countries) to be treated as a single home network so that its subscribers can obtain mobile services across the countries in which it operates networks. The use of equivalency also allows operators to share their network infrastructure for the support of Mobile Virtual Network Operators (MVNOs) and for UEs to attach to different networks i.e. 2G, 3G and 4G operated by their operator even though the different networks have different PLMNs.

Solution to Problem

According to a first aspect of the present invention there is provided a method for configuring a connection between a User Equipment, UE, and a 3rd Generation Partnership Project, 3GPP, compliant mobile communications network at the UE, the method comprising: checking a service equivalency indicator, the service equivalency indicator indicating zero or more mobile communications networks the UE is permitted to transmit a new request for a PDN connection corresponding to a previously rejected request for a PDN connection; and if the service equivalency indicator indicates that there is at least one mobile communications network including the mobile communications network to which the UE is currently attached for which it is permitted to transmit a request for a PDN connection corresponding to a previously rejected request for a PDN connection, and a new PDN connection corresponding to a previously rejected request for a PDN connection is required, the method further comprises transmitting a new request for a PDN connection, the new request corresponding to a previously rejected request for a PDN connection.

The method may also include transmitting the new request to the mobile communications network to which the UE is currently attached.

The method may also include determining whether to transmit a new request for a Packet Data Network, PDN, connection to a mobile communications network; wherein the service equivalency indicator is only checked if the determination is to transmit a new request for a PDN connection to a mobile communications network.

The method may also include, if the service equivalency indictor indicates that for the mobile communications network to which the UE is currently attached it is not permitted to transmit a new request for a PDN connection corresponding to a previously rejected request for a PDN connection and a new PDN connection corresponding to a previously rejected request for a PDN connection is required, transmitting an alternative request for a PDN connection, the alternative request for a PDN connection not corresponding to a previously rejected request for a PDN connection.

The method may also include, if the new request for a PDN connection does not correspond to a previously rejected request for a PDN connection and a new PDN connection corresponding to a previously rejected request for a PDN connection is required, transmitting the new request for a PDN connection.

The method may also include transmitting, to mobile communications network, a request for attachment to the mobile communications network; and receiving, from the mobile communications network in response to the request for attachment, a network equivalency indicator indicating one or more other mobile communications networks which the UE is permitted to treat as equivalent for mobility management purposes; wherein the service equivalency indicator indicates whether the UE is permitted to transmit a new request for a PDN connection corresponding to a previously rejected request for a PDN connection to at least some of the mobile communications networks indicated by network equivalency indicator.

The service equivalency indicator may indicate whether the UE is permitted to transmit a new request for a PDN connection corresponding to a previously rejected request for a PDN connection to substantially all of or substantially none of the mobile communications networks indicated by network equivalency indicator.

The UE may be provided with the network equivalency indicator via pre-configuration prior to attaching to a mobile communications network.

The service equivalency indicator may be included in a Non-Access Stratum, NAS, Management Object defined by 3GPP TS 24.368.

The UE may be provided with the service equivalency indicator by a PDN connection response which indicates rejection of a previous request for a PDN connection.

The method may also include, if a previously received rejection of a request for a PDN connection does not include a service equivalency indicator, permitting the UE to transmit a new request for a PDN connection to at least some of the mobile communications networks indicated by network equivalency indicator.

The method may also include, if a previously received rejection of a request for a PDN connection does not include a service equivalency indicator, permitting the UE to transmit a new request for a PDN connection to at substantially all of the mobile communications networks indicated by network equivalency indicator.

The UE may be provided with the service equivalency indicator by a PDN connection response which indicates rejection of a previous request for a PDN connection, and the service equivalency indicator provides the identities of one or more mobile communications networks the UE is not permitted to transmit the new request for a PDN connection to.

The UE may be provided with the service equivalency indicator by a PDN connection response which indicates acceptance of a previous request for a PDN connection, and the service equivalency indicator provides the identities of one or more mobile communications networks the UE is permitted to transmit the new request for a PDN connection to.

The network equivalency indicator may include one or more Public Land Mobile Network, PLMN, identities for identifying the one or more other mobile communications networks.

The new request for a PDN connection corresponding to a previously rejected request for PDN connection may comprise the requests being of the same type.

The mobile communications network may comprise a Long Term Evolution, LTE, compliant mobile communications network.

According to a second aspect of the present invention there is provided a User Equipment, UE, for configuring a connection with a 3rd Generation Partnership Project, 3GPP, compliant mobile communications network, the UE being arranged to check a service equivalency indicator, the service equivalency indicator indicating zero or more mobile communications networks the UE is permitted to transmit a new request for a PDN connection corresponding to a previously rejected request for a PDN connection; and if the service equivalency indicator indicates that there is at least one mobile communications network including the mobile communications network to which the UE is currently attached for which it is permitted to transmit a request for a PDN connection corresponding to a previously rejected request for a PDN connection, and a new PDN connection corresponding to a previously rejected request for a PDN connection is required, the UE is further arranged to transmit a new request for a PDN connection, the new request corresponding to a previously rejected request for a PDN connection.

Another aspect of the invention provides a mobile communications system comprising a UE and a 3GPP compliant mobile communications network, the 3GPP compliant mobile communications network being arranged to receive from the UE a request for a PDN connection; and to transmit, to the UE in response to the request for a PDN connection, a response indicating the rejection of the request for a PDN connection, wherein the response includes a service equivalency indicator, the service equivalency indicator indicating zero or more mobile communications networks the UE is permitted to transmit a new request for a PDN connection corresponding to the previously rejected request for a PDN connection; and UE is arranged to transmit the request for a PDN connection; to receive the response indicating the rejection of the request for a PDN connection; to determine whether to transmit a new request for a PDN connection to a mobile communications network; to check, if it is determined to transmit a new request for a PDN connection, the service equivalency indicator; and if the service equivalency indicator indicates that there is at least one mobile communications network for which it is permitted to transmit a new request for a PDN connection which corresponds to a previously rejected request for a PDN connection, to transmit the new request for a PDN connection.

Another aspect of the invention provides a method for configuring a connection between a User Equipment, UE, and a 3GPP compliant mobile communications network at the 3GPP compliant mobile communications network, the method comprising: receiving from the UE a request for a PDN connection; and transmitting, to the UE in response to the request for a PDN connection, a response indicating the rejection of the request for a PDN connection, wherein the response includes a service equivalency indicator, the service equivalency indicator indicating zero or more mobile communications networks the UE is permitted to transmit a new request for a PDN connection corresponding to the previously rejected request for a PDN connection.

Another aspect of the invention provides a mobile communications network for configuring a connection with a User Equipment, UE, the mobile communications network being 3GPP compliant and arranged to receive from the UE a request for a PDN connection; and to transmit, to the UE in response to the request for a PDN connection, a response indicating the rejection of the request for a PDN connection, wherein the response includes a service equivalency indicator, the service equivalency indicator indicating zero or more mobile communications networks the UE is permitted to transmit a new request for a PDN connection corresponding to the previously rejected request for a PDN connection.

Another aspect of the present invention provides a method for configuring a connection between a User Equipment, UE, and a 3rd Generation Partnership Project, 3GPP, compliant mobile communications network at the UE, the method comprising: checking a record of one or more previously received PDN connection rejections received from one or more mobile communications network in response to one or more previous requests for a PDN connection, the record indicating one or more mobile communications networks to which the UE is not permitted to transmit a new request for a PDN connection corresponding to a previously rejected request for a PDN connection; and if the mobile communications network to which the UE is currently attached is not indicated by the record, transmitting a new request for a PDN connection, the new request corresponding to a previously rejected request for a PDN connection.

The record of one or more previously received PDN connection rejections may include the mobile communications network from which each previously PDN connection rejection was received.

The record of one or more previously received PDN connection rejections may include an indication of the type of PDN request each PDN connection rejection was received in response to.

Another aspect of the present invention provides a UE for configuring a connection between a User Equipment, UE, and a 3rd Generation Partnership Project, 3GPP, compliant mobile communications network, the UE being arranged to check a record of one or more previously received PDN connection rejections received from one or more mobile communications network in response to one or more previous requests for a PDN connection, the record indicating one or more mobile communications networks which the UE is not permitted to transmit a new request for a PDN connection corresponding to a previously rejected request for a PDN connection; and if the mobile communications network to which the UE is currently attached is not indicated by the record, to transmit a new request for a PDN connection, the new request corresponding to a previously rejected request for a PDN connection.

Another aspect of the invention provides a computer program comprising instructions arranged, when executed, to implement a method and/or apparatus in accordance with any one of the above-described aspects. A further aspect provides machine-readable storage storing such a program.

Advantageous Effects of Invention

Advantageously, certain examples of the present invention allow the application of the concept of network equivalency to requests for a Packet Data Network (PDN) connection, which may be referred to as service equivalency, to be controlled. In particular, networks and user equipment may be configured to implement service equivalency, not to implement service equivalence or partially implement service equivalency. The current use of service equivalency in LTE systems can lead to restrictions in the deployment of networks with differing PDN connectivity capabilities. However, some network operators also rely on service equivalency for effective operation of their networks. Certain embodiments of the present invention allow a network operator to specify to user equipment whether service equivalency should be implemented. Consequently, network operators may implement service equivalency to the extent they require. This therefore allows both networks which do not require service equivalency and those networks which do require service equivalency to operate effectively and alongside one another.

BRIEF DESCRIPTION OF DRAWINGS

Embodiments of the invention are further described hereinafter with reference to the accompanying drawings, in which:

FIGS. 9A and 9B illustrate the steps involved when a UE attaches to and attempts to establish a PDN connection with an LTE network in accordance with an example embodiment of the present invention.

MODE FOR THE INVENTION

Example embodiments of the invention will now be described in the context of an LTE compliant mobile wireless communications network operating in accordance with Release-11 and beyond of the 3GPP LTE standards. However, it will be understood that this is by way of example only and that other example embodiments may involve other wireless networks, operating at least partially in compliance with other releases and other standards such as GSM (2G) and UMTS (3G).

Figure 3:
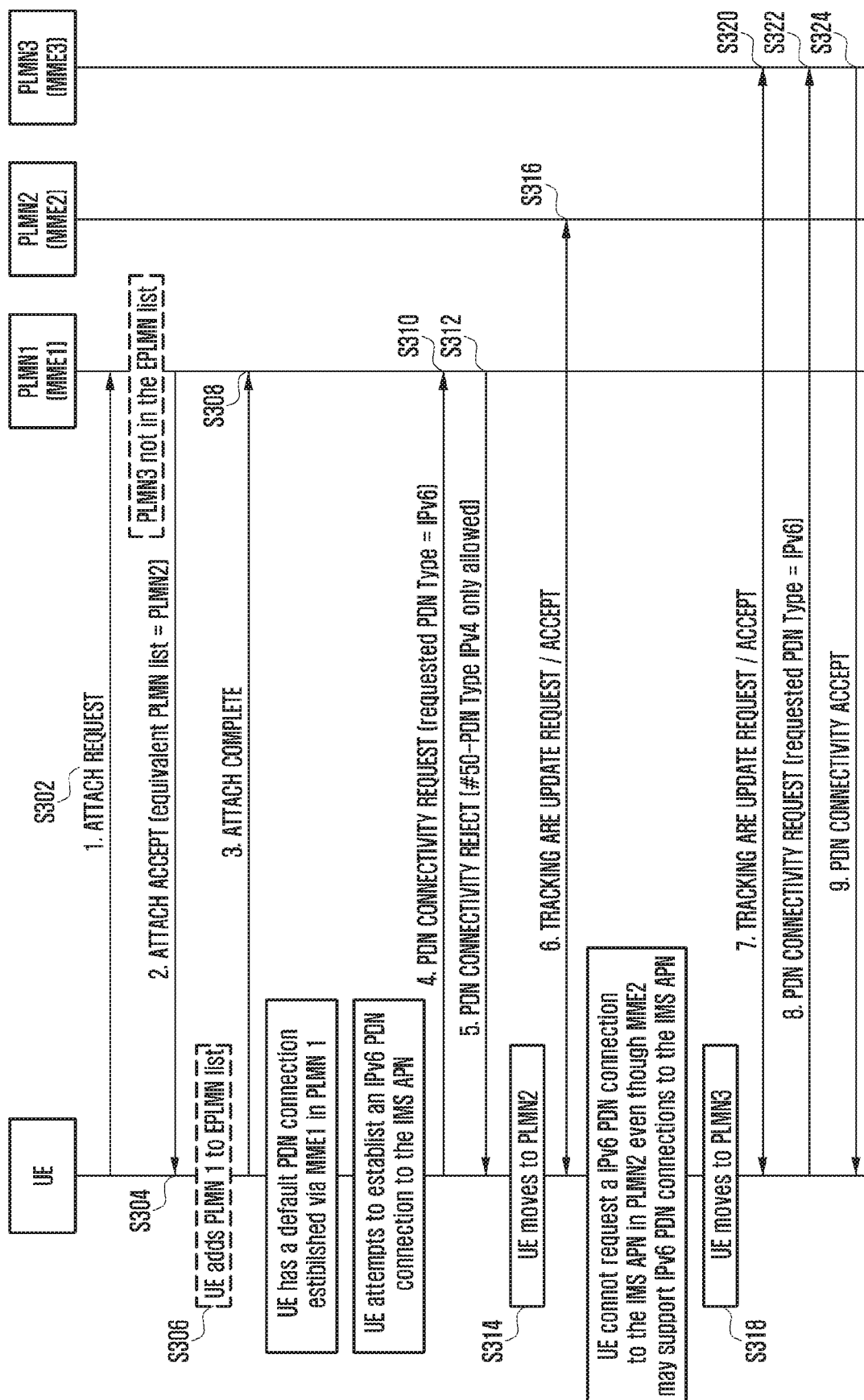
FIG. 3 illustrates the steps involved when a UE attaches to an LTE network implementing equivalent PLMNs and attempts to establish a PDN connection.

FIG. 3 provides an illustration of a simplified attachment procedure of a UE attaching to an LTE network.

At step S302, once a network PLMN1, such as a home PLMN (HPLMN) or an appropriate other network, has been identified by the UE, the UE transmits an attach request to PLMN1, or more specifically to the MME of PLMN 1.

In response to the attach request, the MME and other components of the EPC will perform a number of procedures which are not described here in detail but may include for example authentication, UE identity establishment and security setup. The MME will subsequently either provide the UE with an attach accept or an attach reject message as shown at step S304.

At step S308, if an attach accept message is transmitted by PLMN1 and received by the UE, the UE may then transmit an acknowledgment message in the form of an attach complete message.

Along with the attach accept message, an indication, such as a list, of one or more PLMNs identities may be provided to the UE by PLMN1. Such a list may be known as a "list of equivalent PLMNs" and may be abbreviated for the purposes of this disclosure to "EPLMN list" or "network equivalency indicator". The PLMNs in the EPLMN list should be treated as equivalent to PLMN1 (i.e. the PLMN where the UE is currently registered) in terms of PLMN selection, cell selection/reselection and handover. In FIG. 3, the EPLMN list received by the UE at step S304 comprises PLMN2 but at step S306 the UE also adds the PLMN to which it is currently attached (PLMN1) to the EPLMN list. Consequently, after the completion of the attach procedure, the EPLMN list is shown to include PLMN1 and PLMN2 and therefore the UE is required to treat these two PLMNs as equivalent PLMNs such that the UE may register to either PLMN1 or PLMN2 as a result of the UE performing cell reselection at the Access Stratum Layer, without the UE needing to first perform PLMN selection at the Non-Access Stratum Layer. Steps 302 to 306 result in the establishment of a default Packet Data Network (PDN) connection towards a default APN (Access Point Name).

At step S310, the UE requests a first PDN connection towards an APN in order to request the services of the PDN associated with that APN. In this particular case, the UE sends a PDN connectivity request towards the IP Multimedia Subsystem (IMS) Access Point Name (APN) of PLMN1.

A PDN connectivity request may take a number of forms, for example it may be an IPv4, IPv6 or an IPv4/IPv6 type request. If the PLMN to which the UE is currently attached is capable of providing a PDN connection that corresponds to the PDN connectivity request, a PDN connection acceptance message will be transmitted to the requesting UE and a PDN connection established. However, if the PLMN is not capable of providing a suitable PDN connection, it will provide a PDN connection rejection message which contains an ESM cause message indicating the reason for the rejection. Such cause messages include Cause Code #50—PDN Type IPv4 only allowed, Cause Code #51—PDN type IPv6 only allowed and Cause Code #66—Requested APN not supported in current Radio Access Technology (RAT) and PLMN combination.

At step S310 for example, the UE requests an IPv6 PDN connection with PLMN1 but PLMN1 is capable of providing only IPv4 PDN connections. Consequently, at step S312 the UE receives a PDN connectivity reject message including a cause code #50 is be provided to the UE in a PDN connectivity rejection message as shown.

The behaviour of a UE in response to a PDN connection rejection is specified in, among other places, 3GPP Release 11. In this specification a number of conditions are set out which determine whether a UE is permitted to make another PDN connectivity request of the same kind, so that a high number of repeated PDN connectivity requests of the same kind are not made by a single UE, which could result in further rejections. For example, in the case of cause #50, a repeated attempt equates to the UE sending a PDN connectivity request with a PDN Type of IPv6 for that APN, For example in the case of cause #66, a repeated attempt equates to the UE sending a PDN connectivity request of any PDN Type that includes the APN which caused the network to send cause #66. For example, for the case of cause #50 and #51, these conditions are set out below:

1) A new PLMN which is not in the list of equivalent PLMNs is selected
2) The PDN connection type requested in changed
3) The UE is switched off
4) The USIM is removed from the UE.

Condition 2 is in the scope of the existing procedure for PDN connection establishment. Conditions 3 and 4 are related to specific actions by the user. However, condition 1 is reliant on the concept of PLMN equivalency described above which is designed for mobility management procedures and is not designed for session management procedures. Consequently, a concept initially intended for mobility management has been applied additionally to session management and thus used to control the behaviour of UE in response to PDN connectivity rejection. Consequently, the concept of service equivalency was implied.

However, by virtue of applying the concept of equivalency to the establishment of PDN connections, a number of problems may occur. In particular, condition 1 operates on the assumption that substantially all the PLMNs on the EPLMN list have the same PDN capabilities, which in reality may not be the case. FIG. 3 provides an illustration of such a problem that may arise from the implication of service equivalency.

At Step S312, upon reception of a PDN connectivity rejection from PLMN1 because PLMN1 does not support IPv6 PDN connections and presuming conditions 2 to 4 are not fulfilled, the UE will not make another PDN connectivity request of IPv6 as long as the UE remains in coverage of the PLMN1.

At step 314 the UE may, however, find a suitable cell of PLMN2 with stronger coverage and subsequently register in PLMN2 by performing a tracking area update at step S316.

If condition 1 did not exist, the UE may later attempt to establish a PDN connection with PLMN2 by making a PDN connectivity request towards the MME of PLMN2, where by way of illustration the request is made to the IMS APN. However as the EPLMN list contains PLMN2 (i.e. condition 1 is not fulfilled) the UE will not attempt to establish an IPv6 PDN connection while remaining in the coverage of PLMN2.

More specifically, currently in the Non-Access Stratum (NAS) specifications for unsuccessful EPS context activation procedure (PDN connection establishment), on receiving the ESM cause code #50, #51 and #66, the UE is not allowed to initiate EPS context activation procedure in equivalent PLMNs.

In other words, if PLMN2 is included in the EPLMN list stored in the UE, due to the service equivalency implied by condition 1 above, the UE will be prevented from making a second PDN connectivity request which corresponds to the first request PDN connectivity request at S310 even if PLMN2 supports such PDN connectivity, where a corresponding PDN connectivity request in this disclosure refers to a PDN connectivity request of a same PDN type. Consequently, the UE may be unable to establish a PDN connection with PLMN2 even though PLMN2 supports such a connection. For example, even though PLMN2 supports IPv6 PDN connections and the UE wishes to establish an IPv6 connection, because PLMN2 is in the EPLMN list the UE is not permitted to make an IPv6 PDN connectivity request to PLMN2.

In some examples, at step S318 the UE may find a suitable cell of PLMN3 with stronger coverage and subsequently register in PLMN3 by performing a tracking area update request at S320, though in some examples this may not be necessary when registering with a new PLMN. For example a tracking area update request may not be required if the tracking area identity of the tracking area for the new PLMN to which the UE has moved is in the existing tracking area identity list.

At step S322, as PLMN3 is not indicated in the EPLMN list stored in the UE, the UE is permitted to make a corresponding PDN connectivity request towards to the MME of PLMN3.

At step S324, as PLMN3 supports an IPv6 connection, the PDN connectivity request is accepted by PLMN3 and a PDN connectivity acceptance message is transmitted to the UE. Although in FIG. 3 a PDN connection was established because PLMN3 is not specified in the EPLMN list, in some examples a PDN connection may never be established because the UE may move and register to cells in tracking areas in PLMNs in the EPLMN list but is prohibited from making a corresponding PDN connectivity request to any of the PLMNs which it may register with, precisely because these PLMNs are in the EPLMN list and service equivalency is implied.

As a result of the application of PLMN equivalency to session management as well as mobility management, and in particular to PDN connectivity requests, network operators are restricted in their network deployment. More specifically, the use of equivalency for PDN connections means that it may not be viable to deploy networks which are to be treated as equivalent for mobility management purposes, but have different support for PDN connections because a UE that makes an unsuccessful PDN connectivity request with a first PLMN it will not be permitted to perform a corresponding PDN connectivity request in a second PLMN even though the second PLMN may support such PDN connectivity.

An approach that can overcome the problems associated with the application of PLMN equivalency to PDN connectivity and thus the implication of service equivalency is desirable.

One approach to addressing this problem is to remove the concept of equivalency from session management procedures entirely and specifically from PDN connectivity procedures all together. Although this would be remove the implication of service equivalency and thus remove the restrictions on operator deployment of networks as described above, it may lead to a number of problems in network deployments which rely on service equivalency. For instance, if the concept of service equivalency is removed, a UE may repeatedly attempt to establish a PDN connection with a PLMN which is not capable of supporting such a connection. This will cause significant session management signalling overheads, thus reducing the efficiency of the network. Accordingly, it would be desirable that a solution to reduce the drawbacks arising from service equivalency does not entirely remove support for service equivalency.

Although, PDN connections and PDN connection requests have been referred to up to this point, the concept of equivalency is utilised in multiple 3GPP compliant mobile communication network/systems. For example, in terms of 2G networks, Activate Packet Data Protocol (PDP) Context Request may be viewed as equivalent to LTE PDN connection requests. Consequently, throughout this disclosure, PDN connection requests, requests for a PDN connection and requests for a PDP context all refer to the process of requesting a packet data connection in a 3GPP compliant network. Accordingly, although LTE terminology is predominantly used in the remained of the disclosure, the proposed approaches are not limited thereto but are instead applicable to request for packet data connection in numerous 3GPP compliant mobile communications networks such as 2G, 3G and LTE compliant mobile communications networks.

In accordance with a first example embodiment of the present invention, an additional parameter or indication which may be referred to as a service equivalency indicator or parameter is introduced into the UE configuration process, where the additional parameter indicates whether service equivalency is to be implemented between EPLMNs or not for PDN connectivity requests. In this manner the service equivalency indicator may be seen to be providing an indication of zero or more PLMNs which the UE is permitted to send a PDN connectivity request to that corresponds to a previously rejected PDN connectivity request. For example, if the service equivalency indicator indicates that service equivalency should not be applied to the PLMNs of the EPLMN list, the service equivalency indicator effectively provides an indication that a PDN connectivity request that corresponds to a previously rejection request may be sent to the PLMNs of the EPLMN list.

The service equivalency indicator may be implemented as a single bit or flag and may be provided to UEs via pre-configuration, from its home PLMN upon attainment of IP connectivity using an Open Mobile Device (OMA) Device Management (DM) server, or via Elementary Files (EF) files on the USIM for example. If provided via a configuration server in the home PLMN, the single bit or flag may for example be included in the Non-Access Stratum (NAS) management object TS 24.368 and may be referred to as "Allow service equivalency among EPLMNs" or other similar term for example. However, if may also be provided in other existing or new management objects. If the service equivalency indicator indicates that service equivalency between EPLMNs is not required, a UE which receives a PDN connectivity rejection message from a PLMN may attempt a corresponding PDN connectivity request in any of the PLMNs identified in the most recently received EPLMN list received.

However, if the service equivalency indicator indicates that service equivalency between PLMNs in the EPLMN list is required, once a PDN connectivity rejection message has been received by a UE, the UE is not permitted to perform a corresponding PDN connectivity request with any of the PLMNs in the EPLMN list.

Figure 4:
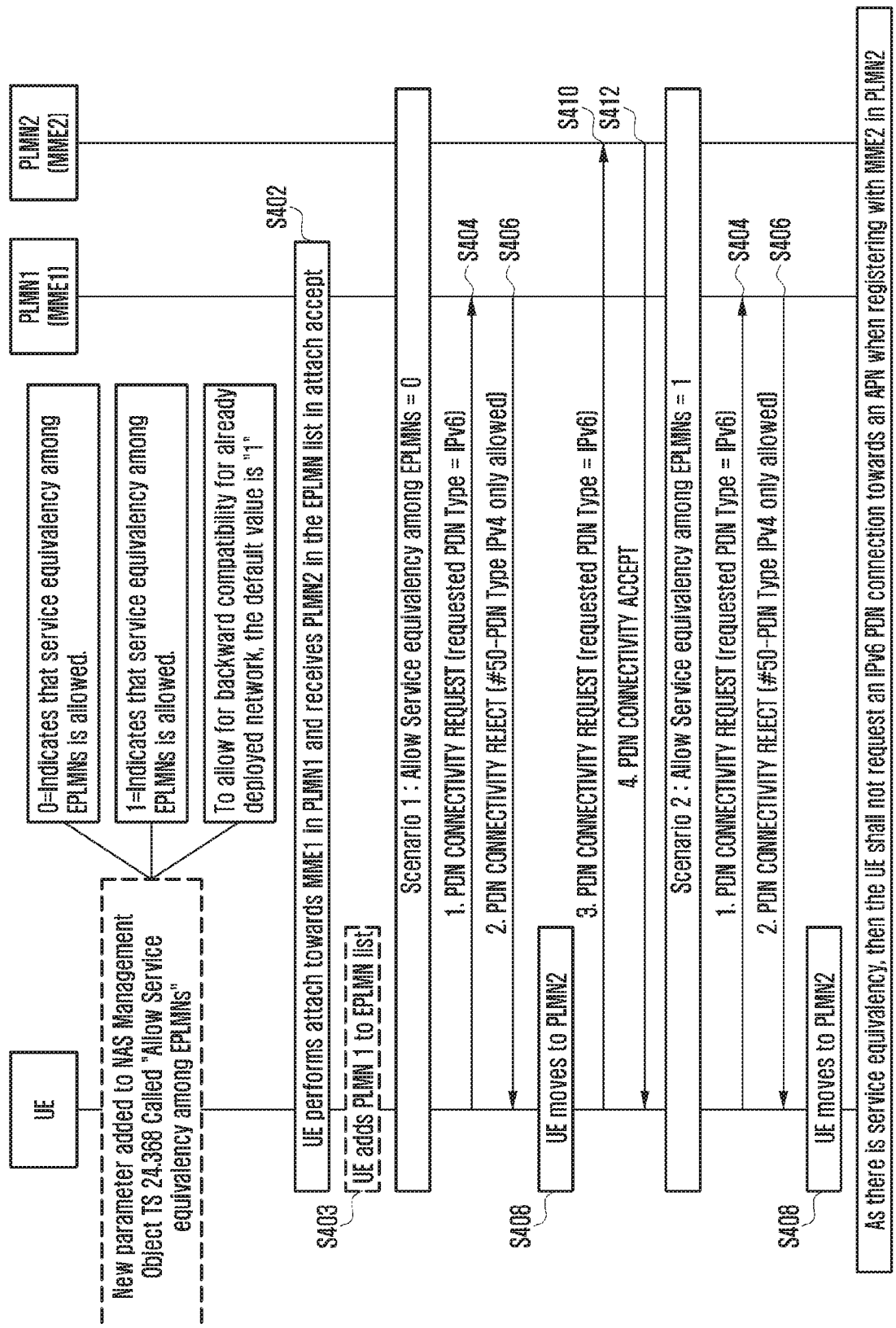
FIG. 4 illustrates the steps involved when a UE attaches to and attempts to establish a PDN connection with an LTE network in accordance with an example embodiment of the present invention.

FIG. 4 provides an illustration of the steps included in a PDN connectivity establishment when a service equivalency indicator is provided to a UE via configuration. The steps shown in FIG. 4 are substantially similar to those in FIG. 3, but the service equivalency indicator controls the steps which may be performed by the UE once a PDN connectivity rejection message is received.

A service equivalency indicator may be provided to a UE via the following methods; (a) inclusion in parameters contained in management object parameters on the UE populated via pre-configuration or provided by a server in the HPLMN when the UE attains IP connectivity; (b) by storing the indicator on an EF file on the USIM, thus allowing the UE to read this indicator from the USIM.

At step S402 the UE attaches towards the MME1 in PLMN1 and along with a attach acceptance message receives an EPLMN list which specifies one or more PLMNS identifiers such as PLMN2.

At step S403 the UE adds its current PLMN to the EPLMN list such that the EPLMN list includes PLMN1 and PLMN2.

At step S404 the UE makes an IPv6 PDN connectivity request to PLMN1.

A step S406, as PLMN1 supports only IPv4 PDN connections, PLMN1 sends a PDN connectivity rejection message to the UE with Cause #50 indicating that it only supports IPv4 PDN connections.

At step S408, the UE registers in PLMN2 because the UE finds better cell coverage in PLMN2 for example and subsequently determines that it wishes to send a second PDN connectivity request because a PDN connection or new PDN connection is required, where the new PDN connection may correspond to a PDN connection of a previously rejected request for a PDN connection or any type of PDN connection. In accordance with the existing approach specified by 3GPP, the UE would not be permitted to send a PDN connectivity request that corresponds to that sent to PLMN1. However, in accordance with the present example embodiment, when a UE moves to another PLMN after receiving a PDN connectivity rejection, it checks the value of the service equivalency indicator and configures its performance accordingly. For instance, if the service equivalency indicator indicates that service equivalency is required, the UE will be not be permitted to make a corresponding PDN connectivity request to PLMN2. However, if the service equivalency indicator indicates that service equivalency should not be applied, the UE will be permitted to make a corresponding PDN connectivity request.

In the example shown as "Scenario 1" in FIG. 4, the service equivalency indicator is set to '0' i.e. service equivalency is not required between any of the PLMNs in the EPLMN list, and the UE is therefore allowed to send an corresponding PDN connectivity request to PLMN2 at Step S410.

At step S412, as PLMN2 supports IPv6 PDN connections, PLMN2 sends a PDN connectivity acceptance message to the UE. If PLMN2 did not support IPv6 PDN connections, the UE would receive an appropriate PDN connectivity rejection message.

In the example shown as "Scenario 2", the service equivalency indicator is set to '1' i.e. service equivalency is required. Consequently, after moving to PLMN2 at step S408 the UE would not be permitted to make a corresponding PDN connectivity request to PLMN2 or any other PLMNs in the EPLMN list, thus the behaviour of the UE would be equivalent to that currently specified in the Release 11 of the 3GPP LTE standard.

The provision of a service equivalency indicator or parameter allows individual operators to tailor the use of service equivalency depending on their network deployment. For example, if a network operator relies on service equivalency for their network operation they may choose to always implement service equivalency. However, if a network operator wishes to deploy PLMNs with different PDN capabilities, the operator may choose not to permit service equivalency as a PDN connectivity rejection in one PLMN does not mean that the UE will receive a PDN connectivity from another PLMN in the EPLMN list if a corresponding PDN connectivity request is made.

This approach of FIG. 4 provides an elegant solution to the problem of equivalency in session management without favouring either service equivalency or no service equivalency. Furthermore, the use of a single bit which may be provided via pre-configuration means that the overheads of such a scheme are low and no operational changes are required at the network.

In order to ensure backwards compatibility for existing networks, the default condition of the service equivalency indicator may be set so as to require service equivalency so that if a UE does not receive a second equivalency indicator it presumes there is equivalency for PDN connectivity requests i.e. service equivalency.

Although the approach of the first example embodiment provides flexibility in the application of service equivalency, because service equivalency is controlled by a HPLMN, when a UE attaches to VPLMNs, the VPLMNs do not have control over the service equivalency implemented by the UE and therefore in some scenarios increased session management signalling may be experienced if the UE is not applying service equivalency when the network deployment is reliant upon service equivalency. This could be mitigated by having a mechanism in the VPLMN to control the configuration or by the second example embodiment below.

In accordance with a second example embodiment of the present invention, an indication of whether service equivalency should be applied between PLMNs is provided to a UE after attachment to a VPLMN through the use of session management signalling. In particular, a service equivalency indicator equivalent to that of the first embodiment is provided to a UE along with a PDN connectivity rejection message, where the service equivalency indicator may once again be a single bit or flag indicating whether to apply service equivalency between PLMNs of the EPLMN list received upon attachment to a PLMN. The provision of the service equivalency indicator by VPLMN therefore allows each VPLMN to exert some form of control over service equivalency which was not possible with the first example embodiment.

The service equivalency indicator may be included in the PDN connectivity rejection message or may be sent subsequently to it in a different message. For example, if included in the PDN connectivity rejection message the service equivalency indicator may be included in an extended cause message. More specifically, a new "Extended ESM Cause" added to PDN Connectivity Reject message (TS 24.301) and new "Extended SM Cause" added to Activate PDP Context Reject message (TS 24.008). The new parameter is of "TV" (Tag-Value) format and contains a parameter in bit 1 called "EPLMN allowed", bits 2-4 are spare and bits 5-8 contain the tag-value.

Figure 5A:
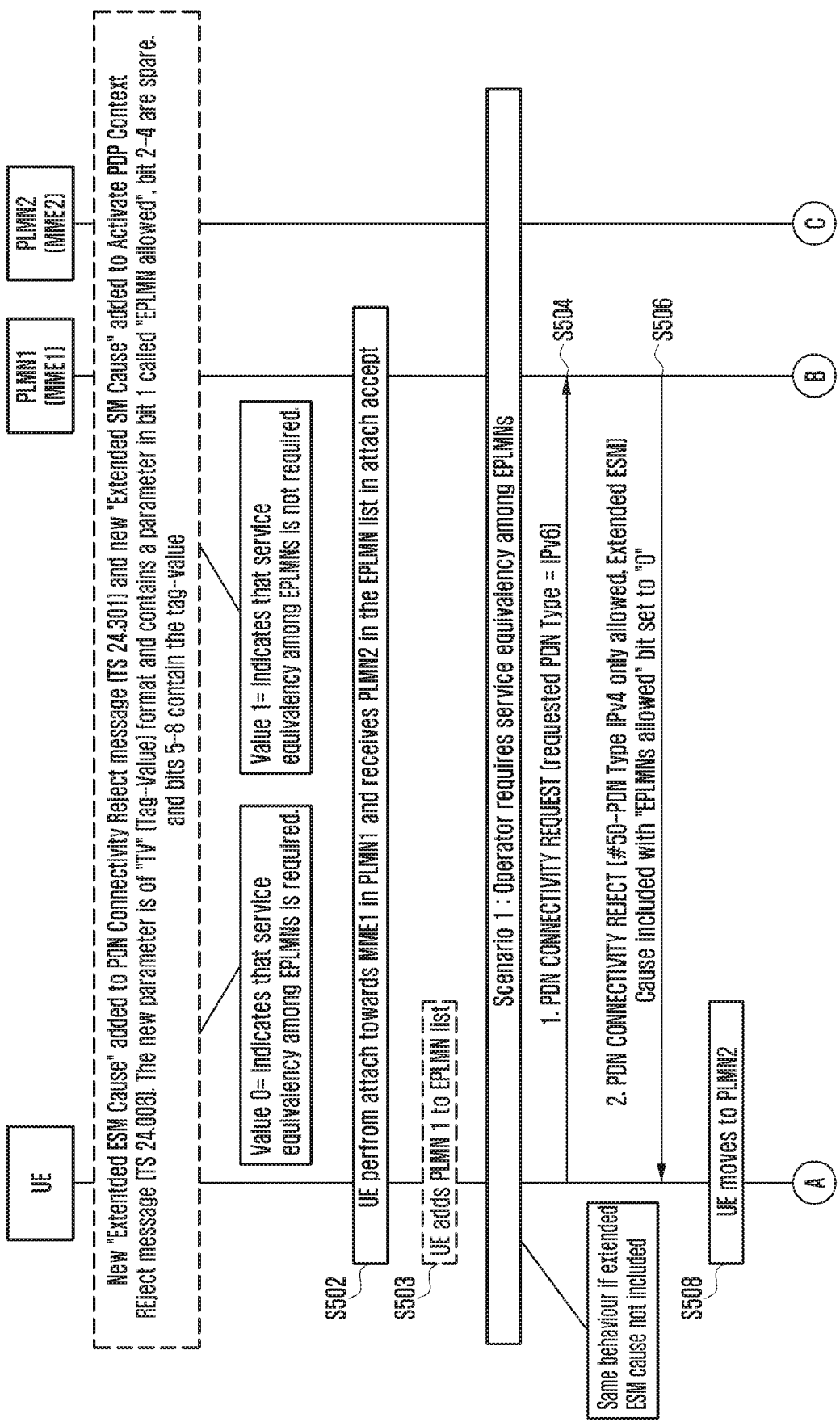
FIGS. 5A and 5B illustrate the steps involved when a UE attaches to and attempts to establish a PDN connection with an LTE network in accordance with another example embodiment of the present invention.
Figure 5B:
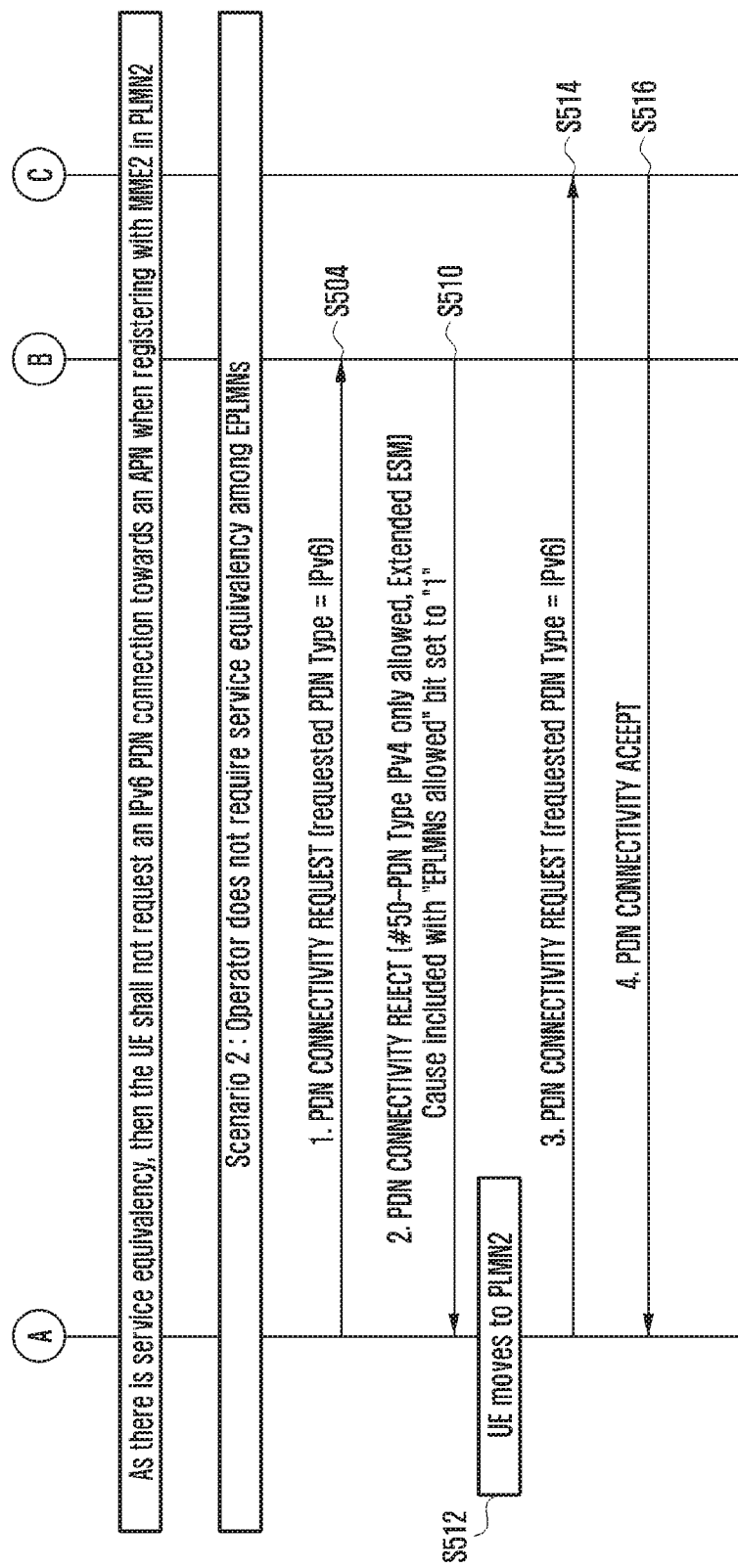

FIGS. 5A and 5B provide an illustration of the steps included in a PDN connectivity establishment when a service equivalency indicator is provided to a UE by a PLMN to which the UE has attached to, which may be a HPLMN or VPLMN.

At step S502 the UE attaches towards MME1 in PLMN1 and along with an attach acceptance message receives an EPLMN list which specifies one or more PLMN identifiers, which in the example of FIGS. 5A and 5B include PLMN2.

A step S503, the UE adds its current PLMN to the EPLMN list such that the EPLMN list includes PLMN1 and PLMN2.

At step S504 the UE makes an IPv6 PDN connectivity request to PLMN1.

At step S506, because PLMN1 supports only IPv4 PDN connections, PLMN1 sends a PDN connectivity rejection message to the UE with Cause #50 indicating that it only supports IPv4 PDN connections. Along with the rejection message a bit/flag indicating whether service equivalency between EPLMNs should be implemented is included and subsequently stored by the UE.

At step S508, the UE moves to PLMN2 and registers and may be provided with a new EPLMN list which is updated in the UE. The UE then determines that a new PDN connection is required, where the new PDN connection may correspond to a PDN connection of a previously rejected request for a PDN connection or any type of PDN connection, but prior to making another PDN connectivity request, checks the value of the service equivalency indicator and configures its behaviour accordingly.

In "Scenario 1" the service equivalency indicator indicates that service equivalency should be applied between PLMNs on the EPLMN list. Consequently, after moving to PLMN2 the UE does not transmit a corresponding PDN connectivity request.

In "Scenario 2", at step S510 the service equivalency indicator indicates that service equivalency should not be applied between PLMNs on the EPLMN list.

At step S512, the UE moves to PLMN2.

A step 514, because the service equivalency indicator indicates that service equivalency should not be applied, the UE is permitted to make a corresponding PDN connectivity request.

At step S516, as PLMN2 supports IPv6 PDN connections, the UE receives a PDN connectivity acceptance message from PLMN2.

Compared to the first example embodiment, the second example embodiment allows VPLMNs to exert control over UE behaviour and therefore implement service equivalence as required by their network deployment. The second example embodiment therefore provides a more flexible implementation. However, because VPLMNs are required to provide a UE with a service equivalency indicator in response to a PDN connectivity rejection message, changes in behaviour are required both at the UE and at the network, which increases the complexity of implementation.

As for the first example embodiment, the second example embodiment once again requires a single bit at the minimum to be implemented and also complies with the Stage 1 requirements set out by 3GPP for equivalent PLMNs.

Figure 6A:
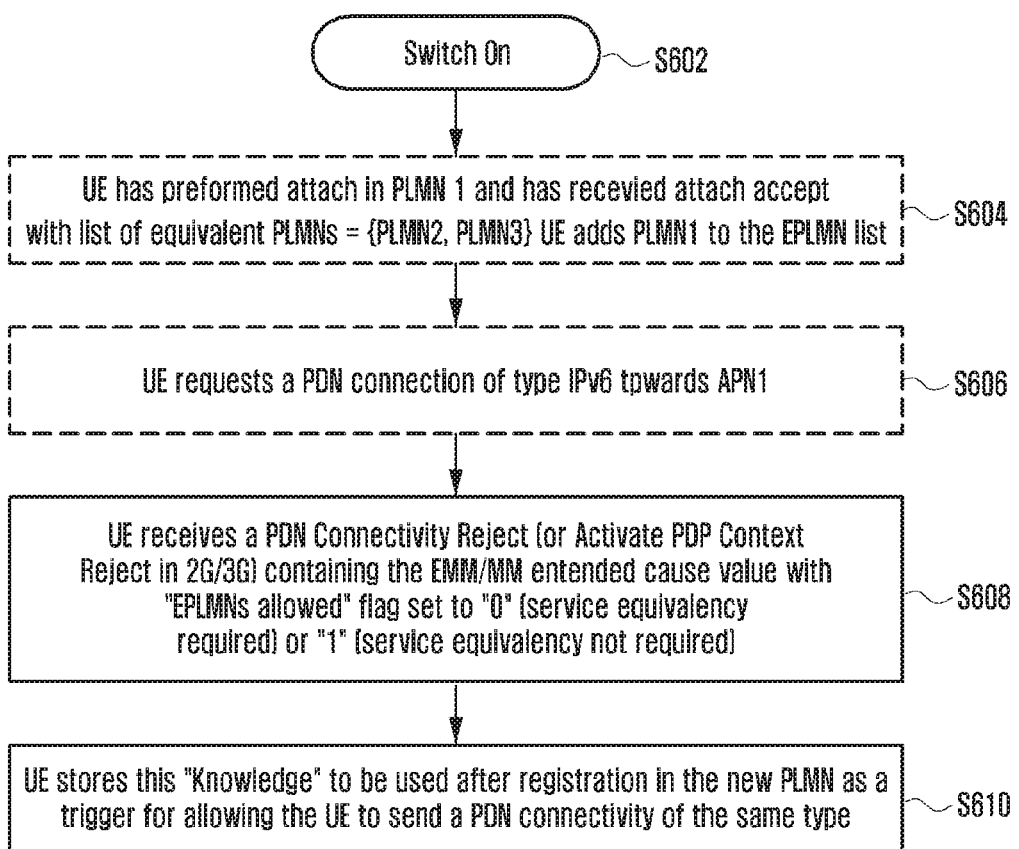
FIGS. 6A and 6B illustrate the steps involved at a UE when a UE attaches to and attempts to establish a PDN connection with an LTE network in accordance with another example embodiment of the present invention.
Figure 6B:
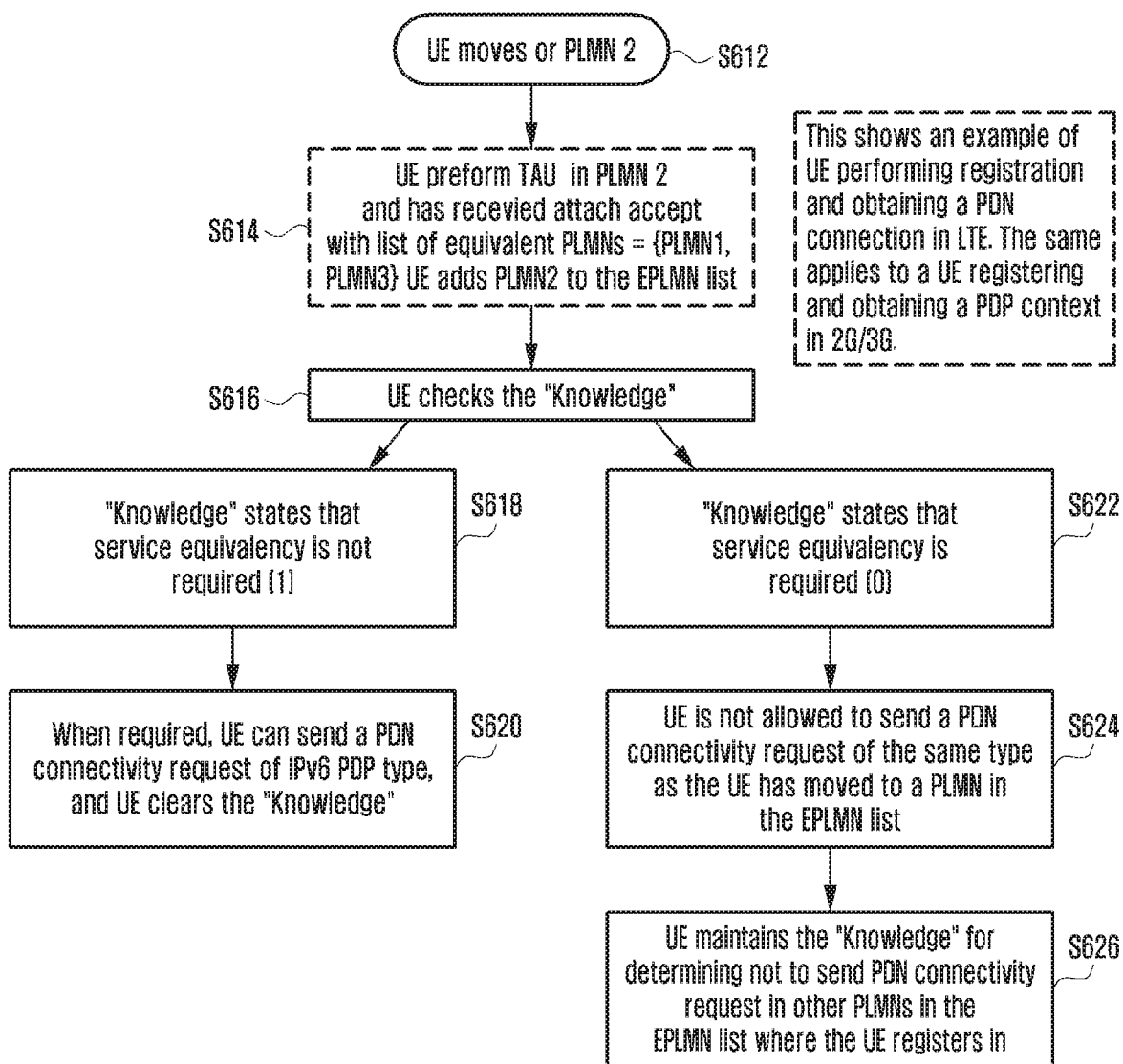

FIGS. 6A and 6B provide further detail on the operation of a UE when operating in accordance with the second example embodiment.

FIGS. 6A and 6B show an example of UE performing registration and obtaining a PDN connection in LTE. The same applies to a UE registering and obtaining a PDP context 2G/3G.

At step S602 the UE is switched-on.

At step S604 the UE attaches to PLMN1 and receives an EPLMN list including the identities of networks PLMN2 and PLMN3, and subsequently adds its current PLMN (PLMN1) to the EPLMN list, where its current PLMN may be a home or visitor network.

At step S606 the UE transmits a request for an IPv6 PDN connection towards APN1 of PLMN1.

At step S608 the UE receives a PDN connectivity reject message from PLMN1 which includes the service equivalency indicator.

At step S610 the value of the service equivalency indicator is stored so that it may be referred to at a later stage.

At step S612 the UE moves to PLMN2.

At step S614 the UE performs a tracking area update, attaches to PLMN2 and receives another EPLMN list which includes PLMN1 and PLMN3. The UE then subsequently adds its current PLMN (PLMN2) to the EPLMN list.

At step S616, the UE determines that a new PDN connection is required, where the new PDN connection may correspond to a PDN connection of a previously rejected request for a PDN connection or any type of PDN connection, but prior to making a corresponding PDN connectivity request, the UE checks the value of the service equivalency indicator i.e. the "knowledge" in order to determine whether it is permitted to make a corresponding PDN connectivity request.

At step S618, the checked service equivalency indicator indicates that service equivalency is not to be applied and the UE is therefore permitted to make a corresponding PDN connectivity request to PLMN2.

At step S620 the UE makes a corresponding PDN connectivity request and clears the stored value of the service equivalency indicator. Clearing the stored value at this point does not affect the functioning of service equivalency because if the PDN connection is accepted it is not necessary to consider service equivalency, and if the PDN connection is rejected a new service equivalency indicator will be provided to the UE to replace the cleared one.

At step S622, the checked service equivalency indicator indicates that service equivalency should be applied and the UE is not permitted make a corresponding PDN connectivity request to PLMNs in the EPLMN list.

At step S624, as the UE has moved to PLMN2 which is in the EPLMN list, the UE is not permitted to send a corresponding PDN connectivity request to PLMN2.

At step S626 the UE maintains the stored value of the service equivalency indicator so that it may determine whether corresponding PDN connectivity requests are permitted to be made in the future.

Figure 7:
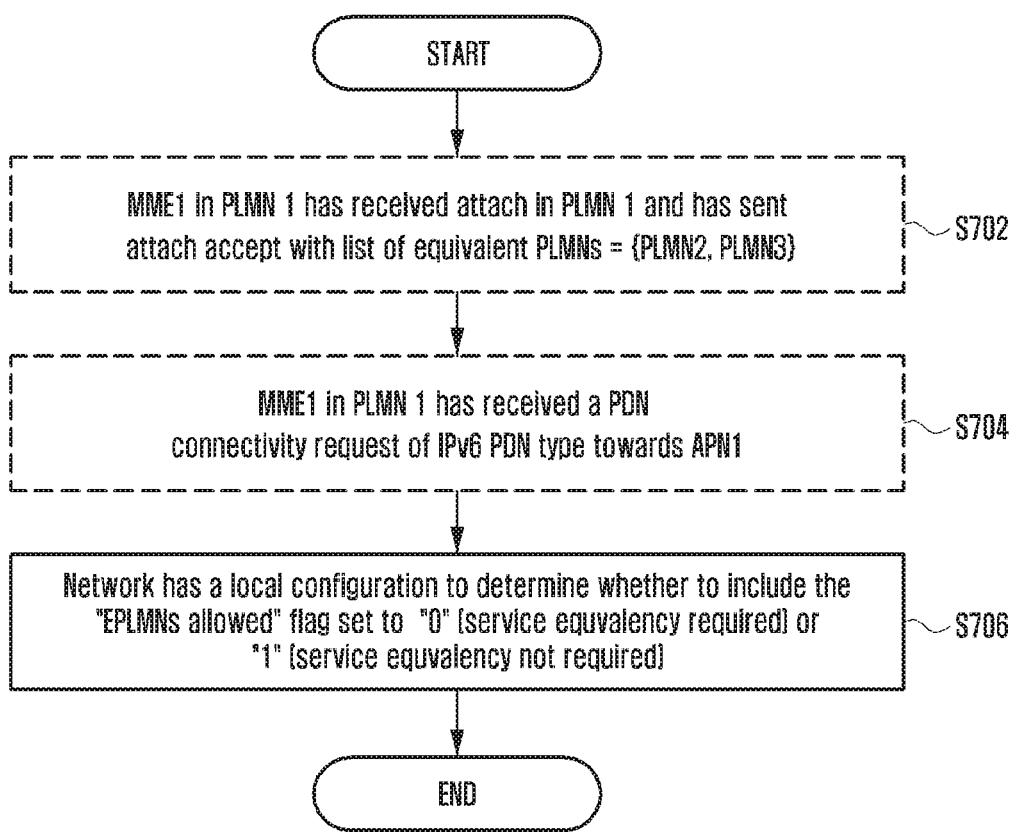
FIG. 7 illustrates the steps involved at a network when a UE attaches to and attempts to establish a PDN connection with an LTE network in accordance with another example embodiment of the present invention.

FIG. 7 provides further detail on an example of the operation of a network when operating in accordance with the second example embodiment.

FIG. 7 shows an example of an LTE network. The same applies a 2G/3G network.

At step S702, MME1 in PLMN1 receives an attach request from a UE and transmits an attach accept message along with an EPLMN list to the UE, where the EPLMN list includes the identities of PLMN2 and PLMN3. The UE subsequently adds PLMN1 to the EPLMN list.

At step S704 MME1 of PLMN1 receives a PDN connectivity request from a UE, which in the example of FIG. 7 is an IPv6 PDN connectivity request.

At step S706, depending on whether PLMN1 supports IPv6 PDN connections, the MME sends a PDN connectivity acceptance or rejection message. If a PDN connectivity rejection message is sent, the MME includes the service equivalency indicator which is set to either "service equivalency required" or "service equivalency not required".

Although the first and second example embodiments provide a simple approach to controlling service equivalency, the flexibilities of the approaches are limited. In particular, the service equivalency indicator indicates whether service equivalency should be applied to all of or none of the PLMNs in the EPLMN list. Consequently, a network operator is unable to tailor the PLMNs that service equivalency may be applied to, when it may be advantageous to do this. For instance, if a UE only supports IPv6 connections it may be useful if a network can specify that service equivalency should only be applied to PLMNs which do not support IPv6 PDN connections so the UE will not attempt to make PDN IPv6 connectivity requests after an initial rejection message.

In accordance with a third example embodiment of the present invention, a UE remembers or records previously received PDN connectivity rejections such that the behaviour of a UE in terms of service equivalency is determined by the UEs previous PDN connectivity rejections. More specifically, a UE is permitted to make a corresponding PDN connectivity requests to a second PLMN in the EPLMN list on the condition that such a PDN connectivity request has not previously been made to the second PLMN. This therefore reduces the likelihood of multiple repeated PDN connectivity requests.

This approach may be achieved by a UE being provided with an indication of previous PDN rejections that it has received. In particular, a UE may record or compile a list of PLMNs from which it has received cause codes #50, #51 and #66, and then consult this list prior to making a PDN connectivity request. If the list indicates that a rejection for a corresponding PDN connectivity request has been received form a PLMN, the UE will not attempt to make a corresponding PDN connectivity request to that PLMN. Service equivalency is therefore based upon a service equivalency indicator provided by the contents of the list compiled by the UE rather than via pre-configuration or a network originating indication.

As for the first and second example embodiments, the list of PLMNs from which rejections have been received may also be viewed as providing an indication of PLMNs the UE is permitted to send a corresponding request for PDN connectivity. For example, the absence of an EPLMN list on the list of PLMNs from which rejections have been received implies that a UE is permitted to transmit a corresponding request for PDN connectivity to such a PLMN. In this manner the service equivalency indicator may be seen to be providing an indication of zero or more PLMNs which the UE is permitted to send a PDN connectivity request that corresponds to a previously rejected PDN connectivity request.

Figure 8:
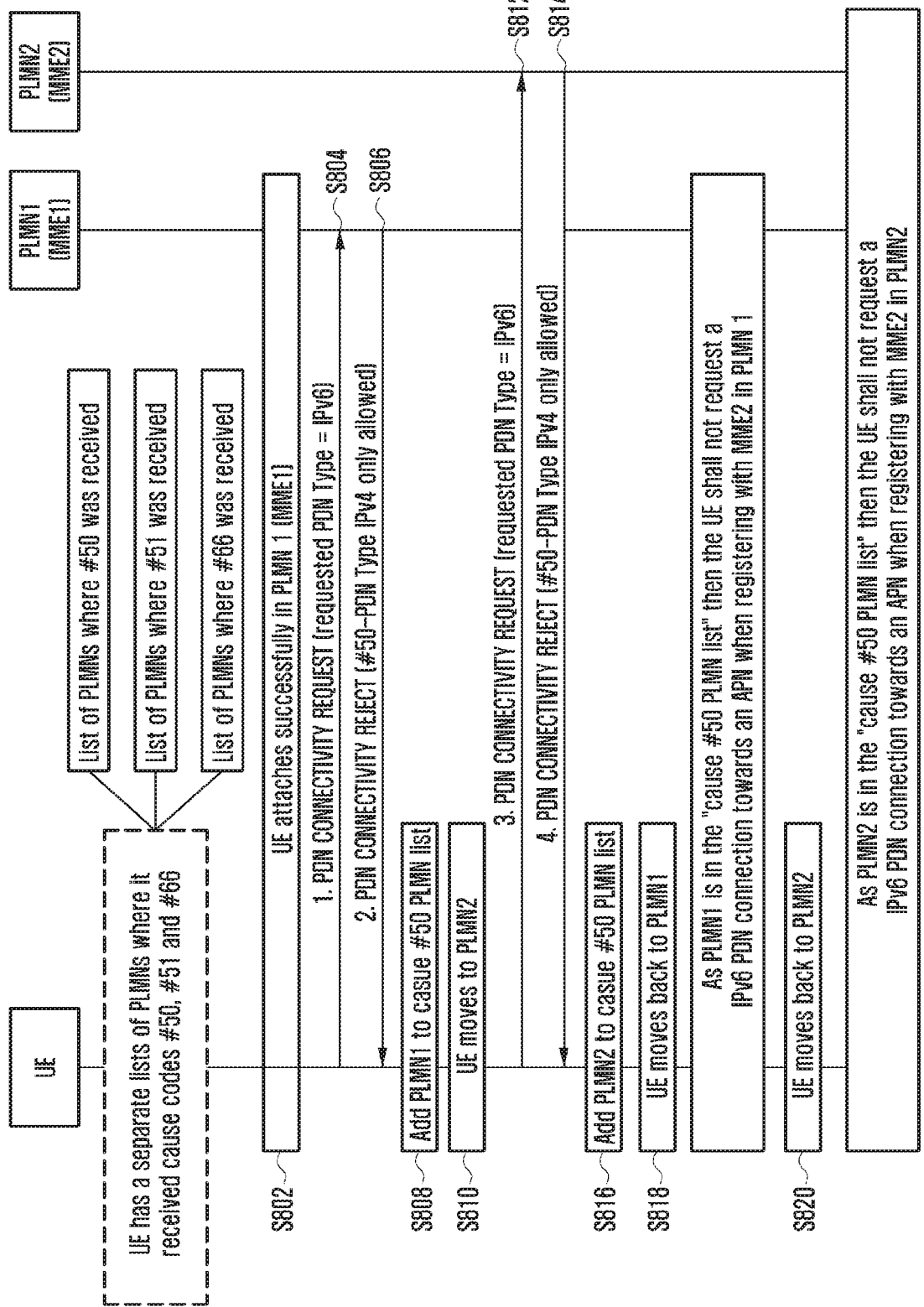
FIG. 8 illustrates the steps involved when a UE attaches to and attempts to establish a PDN connection with an LTE network in accordance with an example embodiment of the present invention

FIG. 8 illustrates the steps included in an approach according to the third example embodiment.

The UE initialises up to one or more lists when the UE is powered on or when the USIM is removed. These lists will then store the identities of PLMNs which it has received each cause code from.

At step S802 the UE attaches towards MME1 of PLMN1 and along with an attach acceptance message receives an EPLMN list which specifies one or more PLMNS identifiers.

At step S804 the UE makes an IPv6 PDN connectivity request to PLMN1.

At step S806, as PLMN1 supports only IPv4 PDN connections, PLMN1 sends a PDN connectivity rejection message to the UE with Cause #50 indicating that it only supports IPv4 PDN connections.

At step S808 the UE adds PLMN1 to the list of PLMNs that it has received a cause #50 rejection messages from.

At step S810 the UE then moves to PLMN2.

At step S812, as PLMN2 is not currently on any of the equivalency lists maintained by the UE, the UE is permitted to make a corresponding PDN connectivity request towards PLMN2.

At step S814, as PLMN2 supports only IPv4 connections the UE receives a PDN connectivity rejection message with cause code #50.

At step S816 the UE then adds PLMN2 to the cause code #50 list.

At step S818 the UE then moves back to PLMN1. However, as the UE has already received a cause code #50 from PLMN1, as indicated by the cause #50 list, the UE is not permitted to make a second PDN connectivity request towards PLMN 1 which could result in a cause #50 PDN connectivity rejection message.

At step S820, as a result of being unable to make a PDN connectivity request to PLMN1 the UE may return to PLMN2. However, as for PLMN1, the UE will not be permitted make another IPv6 PDN connectivity request because PLMN 2 is in the cause code #50 list.

Therefore if an IPv6 PDN connectivity request is to be accepted the UE is required to make such request to PLMNs other than PLMN1 and PLMN2 because these are listed in the cause code #50 list.

The compilation of service equivalency list in this fashion reduces the likelihood of repeated failed PDN connectivity requests being whilst not requiring that full service equivalency be introduced. Therefore it allows network operators to deploy PLMNs which may support different PDN connections without significantly increasing the likelihood of repeated PDN connectivity requests.

Although, providing equivalence as illustrated in FIG. 8 does not directly impact on the operation of PLMNs, additional processing and memory may be required at the UE in order to populate and maintain the lists for each cause code.

In some examples, instead of maintaining a separate list for each cause code, a single list may be maintained where no differentiation is made between PDN connectivity rejections which have different cause codes. In this manner fewer lists may be required but reduced information on the capabilities of PLMN which have rejected PDN connectivity requests is stored. However, the impact of the reduced information may be relatively small if the UE does not change the type of PDN connectivity requests it makes as the number of possible cause codes that may be received in response is narrowed. For example, if a UE only requests IPv6 connections it is likely any cause codes received by the UE will be cause code #50 and thus having single list will not significantly impact the operation of the service equivalency procedure.

In similar manner, list for only some of the cause codes may be maintained, for example list may be maintained for only cause codes #50 and #51.

The approach of the third example embodiment may be implemented individually or may also be combined with approaches of the first and second example embodiments. In particular, when UEs are configured by the service equivalency indicator not to implement service equivalency, a UE may compile a list(s) as set out for the third example embodiment in an effort to reduce the likelihood that repeated PDN connectivity requests will be made to PLMNs.

The list(s) maintained by the UE may be kept until the UE is switched-off, USIM removed or may also be cleared when a PDN connection is established. Alternatively, the list(s) may be kept until a timer expires or entries in list kept until individuals timers expire, whereby each entry in a list is kept for predetermined period of time. The use of timers in this manner allows for the possibility that the capabilities of the PLMNs may change over time. For examples, a PLMN which previously rejected an IPv6 PDN connectivity request may have been upgraded and now be capable of accepting such a PDN connection. Conversely, if entries in the list were maintained for such a time period that PLMN capabilities did change, a UE may still be prohibited from making request to a PLMN even the PLMN is in a position to accept such a PDN connectivity request.

In some examples, the cause code lists may be maintained until indicated by the network that they should be cleared and compilation begun again. This may be useful if a network operator has changed the configuration of its PLMNs such that their PDN connectivity has changed.

In addition to populating lists with PLMNs from which various cause codes have been received, in some examples one or more lists may be populated with PLMNs which have accepted PDN connectivity request. For examples, lists may be maintained for accepted IPv4 and IPv6 PDN connectivity requests. These lists may then be used to provide guidance to the UE on future PDN connectivity requests that can be sent to various PLMNs.

In accordance with a fourth example embodiment of the present invention, a UEs application of service equivalency is determined in accordance with an service equivalency indicator(s) provided to the UE from PLMNs when a PDN connection rejection is received.

More specifically, when a PDN connectivity request is rejected by a PLMN, in addition to the cause code, an indication of one or more other PLMNs to which service equivalence should be applied is provided. For example, if a UE receives a PDN connectivity rejection message from PLMN1, the message may also contain a list of the identifiers of PLMN2 and PLMN3 whereby the UE is not permitted to make a corresponding PDN connectivity request to these networks. Alternatively, the rejection message may contain an indication in the form of a list of PLMNs to which service equivalency should not be applied and thus networks which the UE is permitted to make a corresponding PDN connectivity request. Such lists as these may be referred to SEPLMN lists.

As for the second example embodiment, additional information may be included in a PDN rejection message in order to implement this approach. For example, a new parameter may be added to the rejection message where the new parameter is similar in format to the "PLMN list" parameter in TS 24.008 subclause 10.5.1.13. It will be of "TLV" (Tag-Length-Value) format allowing 15 PLMN-ids (similar to the EPLMN list that is included in NAS EMM messages (i.e. Location Updating Accept, GPRS Attach Accept, Tracking Area Update Accept, Routing Area Update Accept). However, the list of PLMN identities may also be provided via other means such as in a message separate to the PDN rejection message. Alternatively, in some examples the SEPLMN list may be provided via its inclusion in an OMA-DM parameter, therefore restricting the distribution of SEPLMN lists to a HPLMN and requiring a single SEPLMN list to be used in relation to substantially all PDN connection requests.

The service equivalency list of PLMN1 provided in response to a PDN connectivity rejection may include only those PLMNs which are in the EPLMN list obtained by the UE at attachment but in some examples may also include other PLMNs. If PLMNs not in the EPLMN list are identified by the service equivalency indicator, both equivalent and non-equivalent PLMNs may be configured and therefore the flexibility of the approach may be improved.

As for the first and second example embodiments, the service equivalency indicator may also be viewed as providing an indication of PLMNs which the UE is permitted to send a request for PDN connectivity. For example, the absence of a PLMN from the SEPLMN list implies that a UE is permitted to transmit a corresponding request for PDN connectivity to such a PLMN. Consequently, for the fourth example embodiment and the other example embodiments, the service equivalency indicator may be seen to either provide an indication of PLMNs which the UE is permitted to send a corresponding PDN connectivity request to or an indication of PLMNs which the UE is not permitted to send a corresponding PDN connectivity request to.

Multiple service equivalency lists of PLMNs received along with a PDN connectivity rejection message may be compiled into a single composite list or the most recently received list may be used. Alternatively, when a SEPLMN list is received additional parameters included with this list may specify that service equivalency between the PLMN in the SEPLMN should be applied for all session management procedures and rejections. If the most recent list is used the service equivalency behaviour of a UE can be configured to correspond to the EPLMN list received when the UE attached to the PLMN which most recently rejected the PDN connectivity request.

In some examples, a SEPLMN list or an indication of the PLMNs to apply service equivalency to may be provided separately to the rejection message. For example, an indicator of the PLMNs to which to apply service equivalency to may be returned at the same time as the EPLMN list, where the indicator either specifies identifies of PLMNs or simply there place in the EPLMN list e.g. apply service equivalency to entries 2 to 4 of the EPLMN list.

Figure 9B:
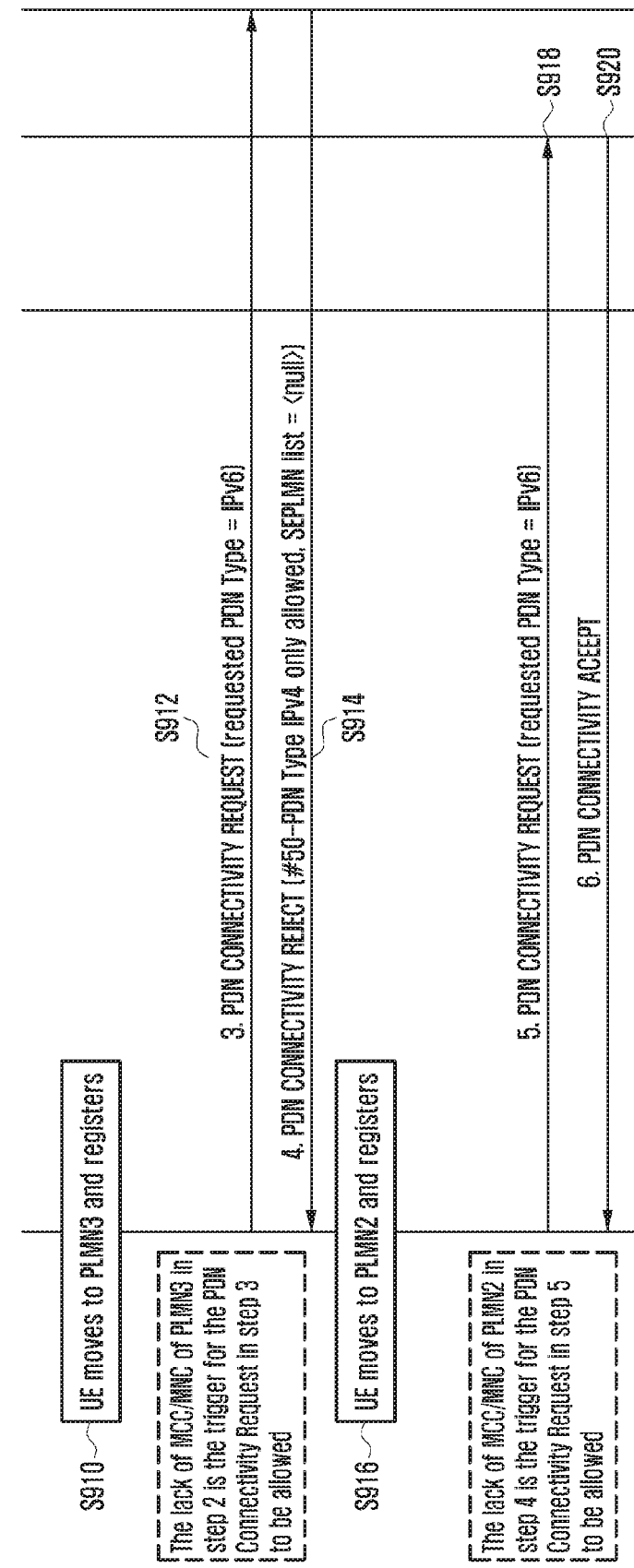

FIGS. 9A and 9B provide an illustration of the steps that may be involved in an example of the fourth embodiment.

At step S902 the UE attaches towards MME1 in PLMN1 and along with an attach acceptance message receives an EPLMN list which specifies one or more PLMNS identifiers.

At step S903 the UE enters its current PLMN in the EPLMN list such that the EPLMN list of FIG. 9 includes PLMN1, PLMN2 and PLMN3.

At step S904, the UE makes an IPv6 PDN connectivity request to PLMN1.

At step S906, as PLMN1 supports only IPv4 PDN connections, PLMN1 sends a PDN connectivity rejection message to the UE with Cause #50 indicating that it only support IPv4 PDN connections. Along with the cause code, the rejection message also includes a service equivalency list which provides an indication of one or more PLMNs which service equivalence should be applied to, which in the case of FIG. 9 is PLMN1 and PLMN2.

At step S908, the UE moves to PLMN2 but because PLMN2 is in the service equivalency list received from PLMN1, the UE does not make an equivalent PDN connectivity request.

At step S910, the UE proceeds to move to PLMN3.

At step S912, as PLMN3 is not included in the service equivalency list received from PLMN2 with the rejection message, the UE is permitted to make a corresponding PDN connectivity request toward PLMN3.

At step S914, as PLMN3 is not capable of providing an IPv6 PDN connection it therefore sends the UE a rejection message, where the rejection message includes a new service equivalency list. In the example of FIG. 9 the list received from PLMN3 is empty and therefore the UE is permitted to make a corresponding PDN connectivity request to any PLMN in the most recently received EPLMN list.

At step S916 the UE moves to PLMN2 and makes a PDN connectivity request at step S918 which is subsequently accepted at step S920.

The approach of FIG. 9 provides a more flexible method to the implementation of service equivalency than the previously proposed approaches but has a larger overhead in terms of the additional signalling because multiple PLMN identifies may be required to provide to a UE when a PDN connectivity request is rejected. This is compared to only single bits or no additional signalling for the approaches of the first, second and third example embodiments.

However, as a trade-off with the increased signalling, the approach of the fourth example embodiment provides network operators with an increased level of control over the implementation of service equivalency. For instance, one example of the fourth embodiment the PLMN identities provided to a UE when a PDN connectivity request is unsuccessful may be dependent on the type of PDN connectivity request which was made and/or the capabilities of the other PLMNs. For instance, if the UE makes an unsuccessful IPv6 PDN connectivity request to a first PLMN, the first PLMN may only provide identities of PLMNs which only support IPv4 PDN connections. Thus allowing the UE to make subsequent IPv6 PDN connectivity requests to PLMNs which support IPv6 connections.

In an alternative example embodiment which operates in a similar fashion to the fourth example embodiment, as opposed receiving a service equivalency indicator in response to a PDN connection rejection, a service equivalency indicator may be provided to a UE in response to the acceptance of a PDN connection request. In particular the service equivalency indicator may indicate zero or more PLMNs which the UE is permitted to send a PDN connection request which corresponds to the accepted PDN connection request. For example, if a UE requested an IPv6 PDN connection and received an acceptance message from PLMN1, a service equivalency indicator included with acceptance message may indicate that the UE is permitted to send an IPv6 PDN connection request to PLMN2.

The provision of a service equivalency in such a manner may allow information on the capabilities of other PLMNs to be provided to the UE. This is turn therefore may allow a UE to adapt its behaviour when it comes to request a subsequent PDN connection and therefore reduce the likelihood of requests for a PDN connection being rejected.

Although in the example embodiments described above LTE compliant UEs and networks are considered, the concept of service equivalency is also present in other system such as 2G and 3G systems. Consequently, the example embodiments described above may also be applied to systems other than LTE systems. For example, in 2G or 3G systems Packet Data Protocol (PDP) context requests may be made by UEs instead of PDN connectivity requests and the indication provided by a rejecting PLMN may be included as parameters other than those specified for the example embodiments described above.

Figure 1:
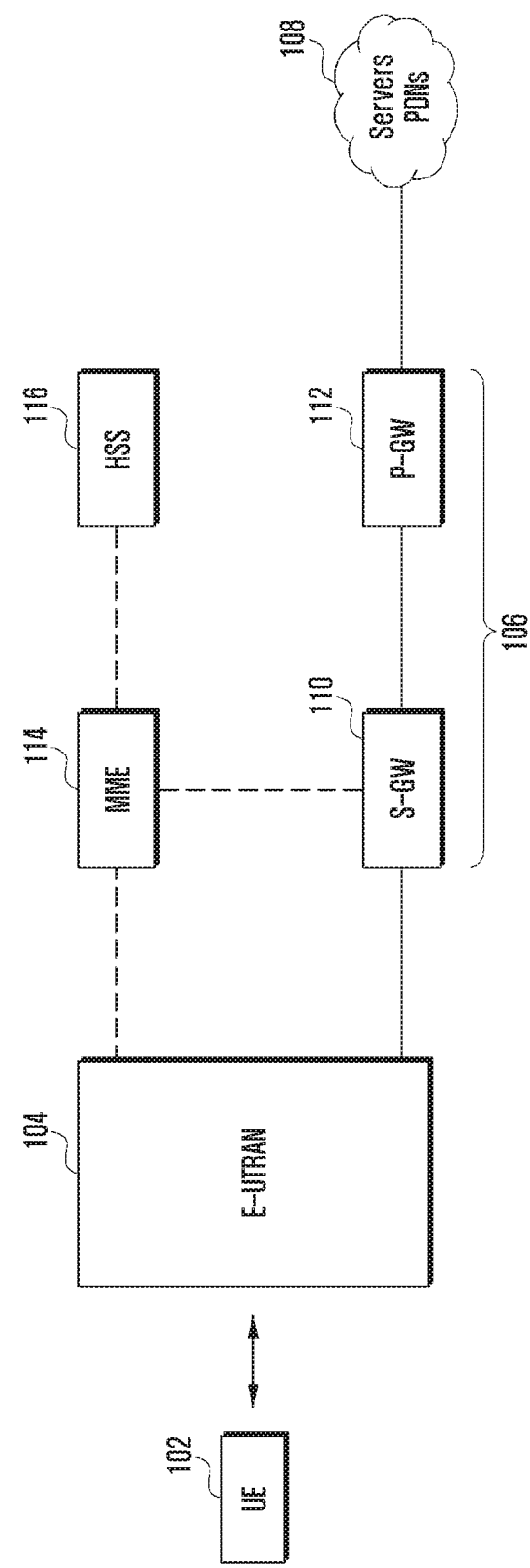
FIG. 1 schematically illustrates an overview of an LTE mobile communication network.
Figure 2:
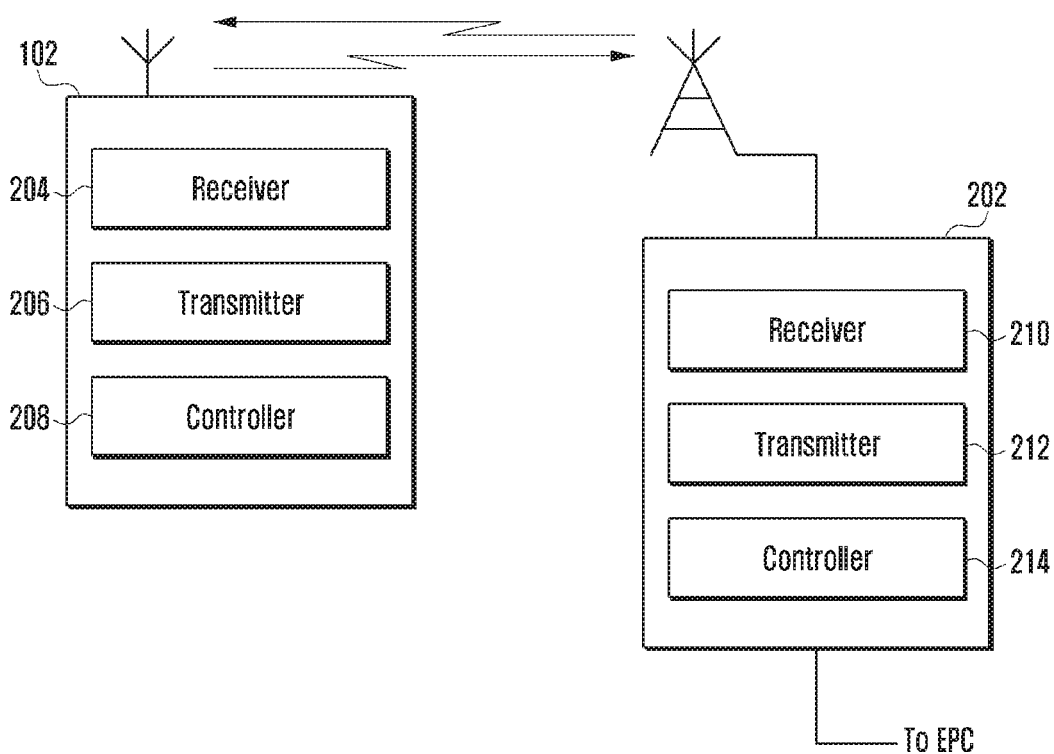
FIG. 2 schematically illustrates an a UE and an eNB of an LTE mobile communications network.

The UE functionality described above may be implemented using the receiver, controller and transmitter of the example UE described with reference to FIG. 2. However, the UE functionality may also be implemented on a multiple purpose processor which executes computer readable instructions stored on a computer readable medium which when executed configure the multiple purpose processor and peripheral components to perform the functionality described with reference to the example embodiments.

The network functionality described above may be implemented using the receiver, controller and transmitter of the example eNB as well as the component of the core network described with reference to FIG. 2. However, the network functionality may also be implemented on a multiple purpose processor which executes computer readable instructions stored on a computer readable medium which when executed configure the multiple purpose processor and peripheral components to perform the functionality described with reference to the example embodiments The above example embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method by a terminal in a wireless communication system, the method comprises:

storing an equivalent public land mobile network (EPLMN) list configured for the terminal, the EPLMN list including at least one PLMN which is regarded as equivalent to each other;

transmitting, to a first node of a first PLMN of the EPLMN list configured for the terminal, a first request message associated with a packet data network (PDN) connectivity of a PDN type;

receiving, from the first node of the first PLMN, a message rejecting the first request message, the message including a cause value indicating the PDN type is not allowed;

transmitting, to a second node of a second PLMN of the EPLMN list configured for the terminal, a second request message associated with the PDN connectivity of the PDN type, in case that the terminal registered to the second PLMN and the message further includes an indicator indicating that the terminal is allowed to request the PDN connectivity of the PDN type for a PLMN in the EPLMN list; and prohibiting a transmission of the second request message associated with the PDN connectivity of the PDN type, in case that the indicator indicates that the terminal is not allowed to request the PDN connectivity of the PDN type for a PLMN in the EPLMN list, wherein the EPLMN list configured for the terminal is kept while the terminal is switched off and deleted in case that a universal subscriber identification module (USIM) is removed from the terminal, and wherein the second request message is transmitted to the second node of the second PLMN, as a result of the indicator being not included in the message.

2. The method of claim 1, wherein the receiving further comprises:

wherein the message is received from the first node in case that the first PLMN does not support the PDN type.

3. A terminal in a wireless communication system, the terminal comprises:

a transceiver configured to transmit and receive a signal; and a controller configured to control the transceiver to:

store an equivalent public land mobile network (EPLMN) list configured for the terminal, the EPLMN list including at least one PLMN which is regarded as equivalent to each other, transmit, to a first node of a first PLMN of the EPLMN list configured for the terminal, a first request message associated with a packet data network (PDN) connectivity of a PDN type, receive, from the first node of the first PLMN, a message rejecting the first request message, the message including a cause value indicating the PDN type is not allowed, transmit, to a second node of a second PLMN of the EPLMN list configured for the terminal, a second request message associated with the PDN connectivity of the PDN type, in case that the terminal registered to the second PLMN and the message further includes an indicator indicating that the terminal is allowed to request the PDN connectivity of the PDN type for a PLMN in the EPLMN list, and prohibit a transmission of the second request message associated with the PDN connectivity of the PDN type, in case that the indicator indicates that the terminal is not allowed to request the PDN connectivity of the PDN type for a PLMN in the EPLMN list, wherein the EPLMN list configured for the terminal is kept while the terminal is switched off and deleted in case that a universal subscriber identification module (USIM) is removed from the terminal, and wherein the second request message is transmitted to the second node of the second PLMN, as a result of the indicator being not included in the message.

4. The terminal of claim 3, wherein the message is received from the first node, a rejection message including the indicator in case that the first PLMN does not support the PDN type.

5. A method of a first node of a first public land mobile network (PLMN) in a wireless communication system, the method comprises:

receiving, from a terminal, a first request message associated with a packet data network (PDN) connectivity of a PDN type; and transmitting, to the terminal, a message rejecting the first request message, the message including a cause value indicating that the PDN type is not allowed, and wherein an equivalent public land mobile network (EPLMN) list configured for the terminal, the EPLMN list including at least one PLMN which is regarded as equivalent to each other and comprising the first PLMN, wherein a second request message associated with the PDN connectivity of the PDN type is transmitted, by the terminal, to a second node of a second PLMN of the EPLMN list configured for the terminal, in case that the terminal registered to the second PLMN and the message further includes an indicator indicating that the terminal is allowed to request the PDN connectivity of the PDN type for a PLMN in the EPLMN list, wherein a transmission of the second request message associated with the PDN connectivity of the PDN type is prohibited by the terminal, in case that the indicator indicates that the terminal is not allowed to request the PDN connectivity of the PDN type for a PLMN in the EPLMN list, wherein the EPLMN list configured for the terminal is kept while the terminal is switched off and deleted in case that a universal subscriber identification module (USIM) is removed from the terminal, and wherein the second request message is transmitted to the second node of the second PLMN, as a result of the indicator being not included in the message.

6. The method of claim 5, wherein the message including the indicator is transmitted to the terminal in case that the first PLMN does not support the PDN type.

7. A first node of a first public land mobile network (PLMN) in a wireless communication system, the first node comprising:

a transceiver configured to transmit and receive a signal; and a controller configured to control the transceiver to:

receive, from a terminal, a first request message associated with a packet data network (PDN) connectivity of a PDN type, and transmit, to the terminal, a message rejecting the first request message, the message including a cause value indicating the PDN type is not allowed, wherein an equivalent public land mobile network (EPLMN) list configured for the terminal, the EPLMN list including at least one PLMN which is regarded as equivalent to each other and comprising the first PLMN, wherein a second request message associated with the PDN connectivity of the PDN type is transmitted, by the terminal, to a second node of a second PLMN of the EPLMN list configured for the terminal, in case that the terminal registered to the second PLMN and the message further includes an indicator indicating that the terminal is allowed to request the PDN connectivity of the PDN type for a PLMN in the EPLMN list, wherein a transmission of the second request message associated with the PDN connectivity of the PDN type is prohibited by the terminal, in case that the indicator indicates that the terminal is not allowed to request the PDN connectivity of the PDN type for a PLMN in the EPLMN list, wherein the EPLMN list configured for the terminal is kept while the terminal is switched off and deleted in case that a universal subscriber identification module (USIM) is removed from the terminal, and wherein the second request message is transmitted to the second node of the second PLMN, as a result of the indicator being not included in the message.

8. The first node of claim 7, wherein the message including the indicator is transmitted to the terminal in case that the first PLMN does not support the PDN type.

* * * * *